United States Patent
Saunders et al.

[19]

[11] Patent Number: 5,933,459
[45] Date of Patent: Aug. 3, 1999

[54] DUAL REFERENCE VOLTAGE INPUT RECEIVER FOR HIGH SPEED DATA TRANSMISSION

[75] Inventors: Gary Saunders, Folsom; Michael J. Allen, Rescue, both of Calif.

[73] Assignee: Intel Corporation, Santa Clara, Calif.

[21] Appl. No.: 08/777,524

[22] Filed: Dec. 30, 1996

[51] Int. Cl.[6] ..................................... H04L 25/06
[52] U.S. Cl. .................. 375/317; 375/287; 375/318; 327/52; 327/72; 327/74
[58] Field of Search .................................. 375/316, 317, 375/318, 319, 287; 327/50, 51, 52, 57, 54, 56, 58, 62, 72, 74

[56] References Cited

U.S. PATENT DOCUMENTS

| | | | |
|---|---|---|---|
| 5,117,124 | 5/1992 | Dicke | 327/212 |
| 5,214,319 | 5/1993 | Abdi | 327/58 |
| 5,373,400 | 12/1994 | Kovacs | 327/62 |
| 5,465,059 | 11/1995 | Pan et al. | 327/74 |
| 5,576,842 | 11/1996 | Choi | 386/46 |

*Primary Examiner*—Chi H. Pham
*Assistant Examiner*—Emmanuel Bayard
*Attorney, Agent, or Firm*—Leo V. Novakoski

[57] ABSTRACT

A dual reference voltage input receiver comprises a latch, comparison logic for determining the voltage level of a data signal relative to that of first and second reference voltage levels, and selection logic for determining which of the reference voltage levels is operative for a given data interval, e.g. clock cycle. The latch couples the determined voltage level of the data signal to a subsequent stage and to the selection logic for determining the operative reference voltage level in the next data interval. In one embodiment of the invention, the comparison logic includes first and second comparators for comparing the data signal with first and second reference voltages, and the selection logic is a MUX having its data inputs coupled to the comparators' outputs and its selection input coupled to the data output of the latch.

27 Claims, 6 Drawing Sheets

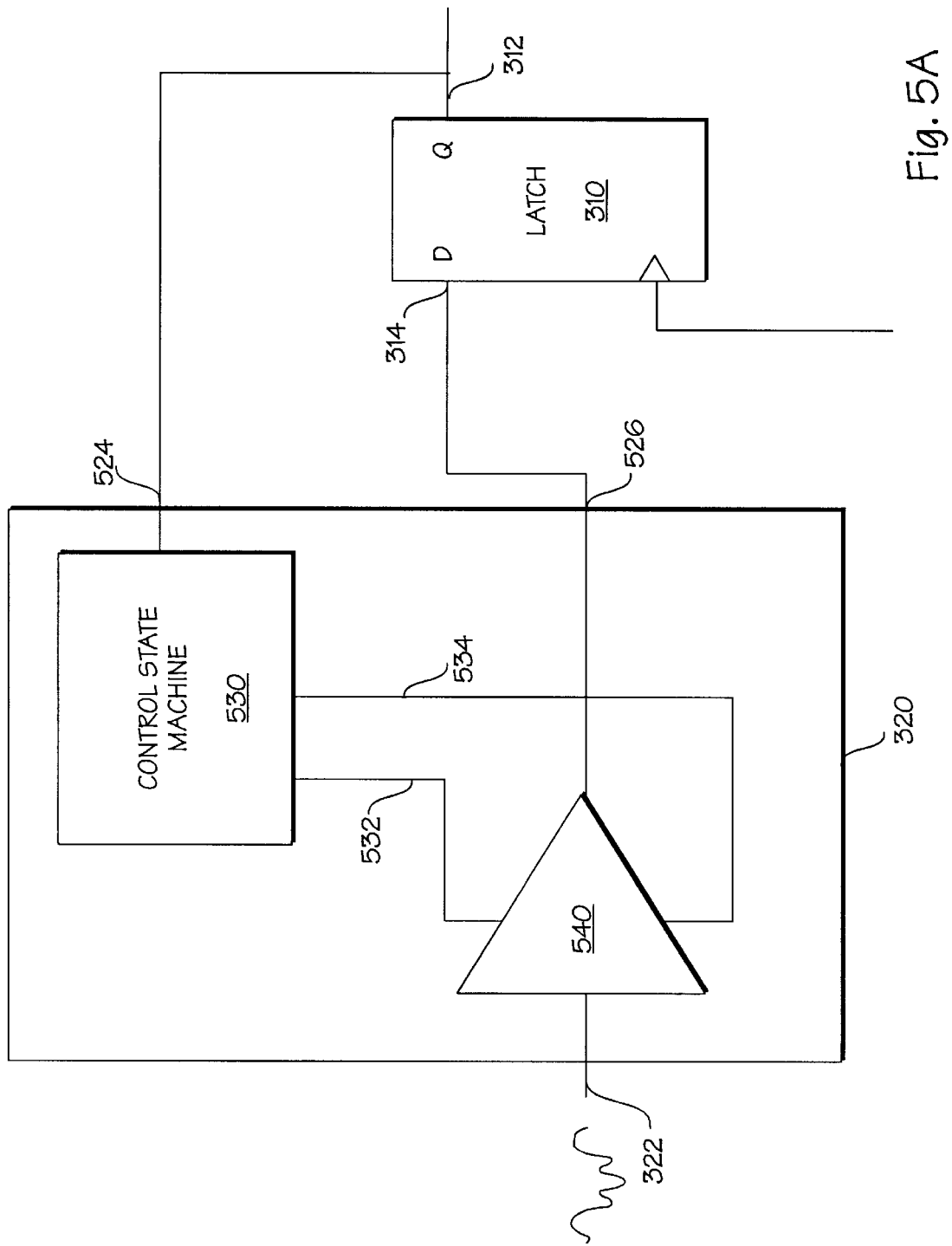

DUAL REFERENCE VOLTAGE INPUT RECEIVER FOR HIGH SPEED DATA TRANSMISSION

BACKGROUND OF THE INVENTION

1. Technical Field

This invention relates to the field of data transmission, and in particular to systems and methods for reliably determining the voltage level of data signals transmitted at high speeds.

2. Background Art

Computers and other data processing devices operate at ever increasing frequencies. In order to avoid bottlenecks, data must be provided to these devices at high speeds and without distortion. However, as transmission frequencies exceed 150 MHz, it becomes more difficult to ensure that transmitted data signals have sufficient time to settle before they are sampled and the next data transition begins. This problem is compounded by the need to operate computers at lower system voltages, to limit the power dissipated by high frequency processors.

High frequency operation of buses, which transfer data signals to different parts of the computer system, poses especially difficult problems. At frequencies of 100 MHz or more, bus traces behave like transmission lines. In particular, the inductive and capacitive properties of bus traces distort data signals, increasing the time it takes for signal voltages to settle sufficiently to be sampled reliably.

For example, at high frequencies, the capacitance of bus traces requires signal transitions to be driven with higher currents, and for 32-bit and wider buses, the number of signal transitions being driven results in substantial current pulses on the supply voltage lines. These current pulses couple with the inductance of the bus traces to generate voltage glitches. In addition, impedance mismatches between the bus and the circuits driving the data signal creates reflections on the bus. Data signals are distorted by reflected signals generated by voltage glitches and signal voltages. One result of these distortions is that a data signal in a given clock cycle may appear to be in either a high or low voltage state, depending on when in the clock cycle it is sampled by a receiver.

Conventional strategies for handling high speed data signals employ circuitry to guarantee a window of relatively clean signal transitions, and a single reference voltage is selected within this voltage window. There are a number of drawbacks to this approach. Noise is generated differently for high-going and low-going transitions, and the resulting asymmetry in the signal distortion must be accounted for by the circuitry. In addition, the circuitry used to provide a clean voltage window becomes more complex and less effective as signal frequencies increase.

SUMMARY OF THE INVENTION

The present invention employs dual reference voltage levels to determine the voltage levels of data signals transmitted at high frequencies. In accordance with the present invention, a first reference voltage is biased towards a high voltage state and a second reference voltage level is biased towards a low voltage state. The data signal in a sampling interval is compared to the first reference voltage when the data signal in the preceding sampling interval was determined to be in the high voltage state. The data signal in the sampling interval is compared to the second reference voltage when the data signal in the preceding sampling interval was determined to be in the low voltage state.

The present invention may be implemented by a dual reference voltage receiver that includes comparison logic, a latch, and voltage selection logic that is coupled to the latch and the comparison logic. The comparison logic provides an indication of a voltage state for a received data signal relative to an operative reference voltage. The latch receives the voltage state indication and couples it to its output in response to a timing signal, and the voltage selection logic selects the operative reference voltage from the first and second reference voltages, according to the voltage state indication at the latch output.

The use of dual reference voltage levels improves the margin between the data signal and the operative reference voltage level, when the data signal transitions between high and low states. It also increases the time interval (timing margin) during which the voltage level of the data signal can be measured reliably.

BRIEF DESCRIPTION OF THE DRAWINGS

The present invention may be best understood with reference to the following detailed description and the accompanying drawings.

FIG. 5A is a block diagram of another embodiment of the dual reference voltage receiver of FIG. 3.

DETAILED DISCUSSION OF THE INVENTION

The present invention is a system and method for determining reliably the voltage levels of data signals transmitted at high frequencies. The reference voltage level used for the data signal in a given interval is adjusted according to whether the data signal in the preceding interval was in a high or a low voltage level. This adjustment is designed to increase the difference between the reference voltage level used the interval and a data signal making a high and low going transitions at the start of the interval. This makes it easier to determine the voltage level of the data signal before the data signal has fully settled. It also increases voltage signal to noise level and the sampling interval (time margin) during which the signal level can be measured accurately.

Figure 1:
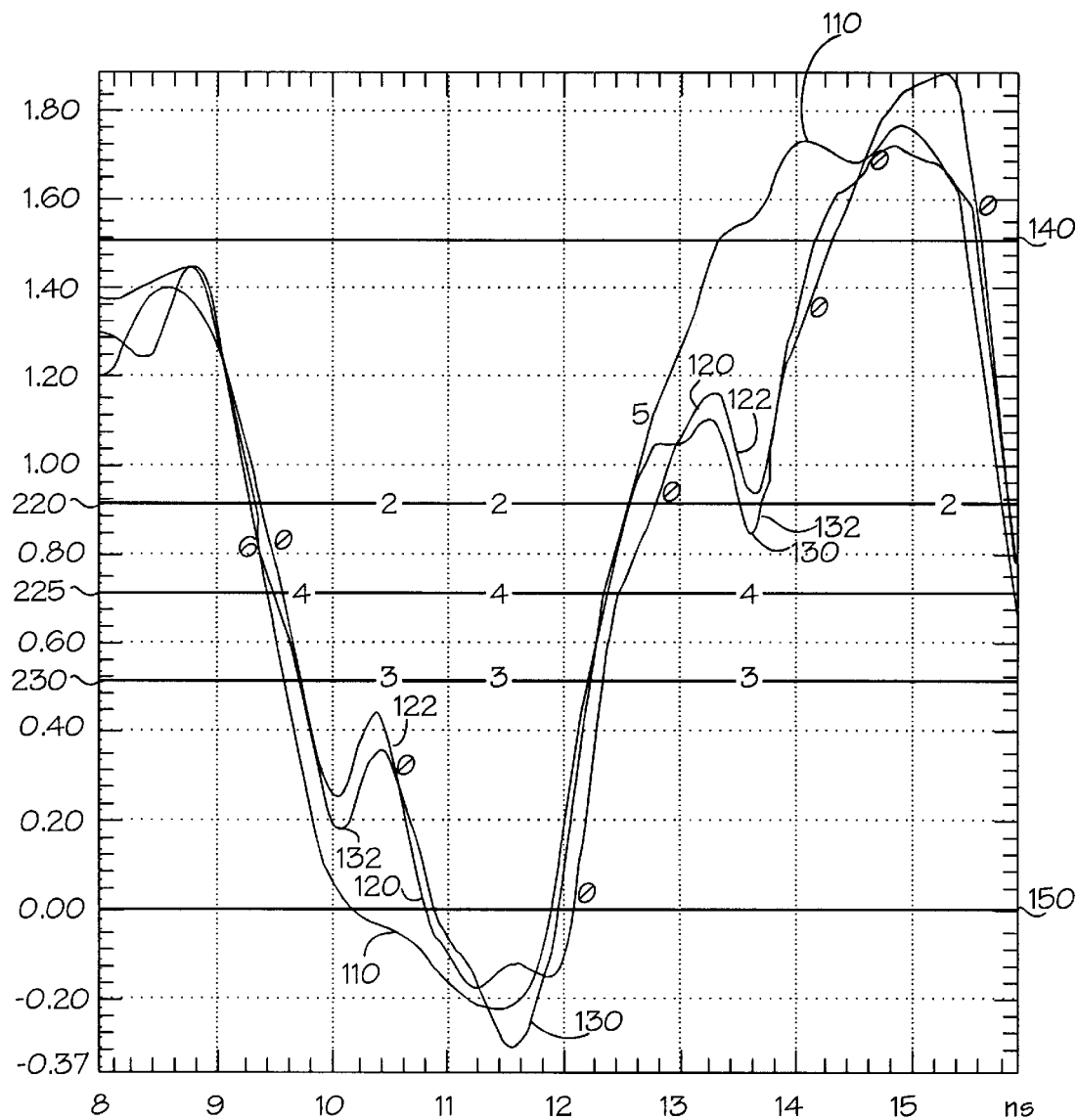
FIG. 1 is a schematic representation of 150 MHz data signals under various loading conditions.

Referring first to FIG. 1, there are shown 150 MHz data signals 110, 120, 130 under various loading conditions. Signal 110 represents a signal being driven onto a single 3 inch conductive trace at 150 MHz. Due to relatively low current associated with switching a single conductive trace, signal 110 exhibits relatively minor distortions.

Signal 120 represents a data signal being driven simultaneously onto multiple 2 inch conductive traces at 150 MHz. Simultaneous switching of multiple signals, referred to as simultaneously switched outputs or SSO, is very common in bus systems where multiple address or data lines change state with each clock cycle. Signal 120 exhibits substantially greater distortion than signal 110. This is due in part to the larger currents necessary to drive transitions on multiple traces simultaneously. The resulting current pulses couple with the inductance of the traces to generate voltage glitches (noise). At signal frequencies in excess of 150 MHz, impedance mismatches between the bus traces and driving circuits cause voltage pulses to be reflected. Interference between reflected and transmitted signals creates ledges 122 in data signal 120.

Data signal 130 represents the effects of SSO on a 3 inch trace. Like data signal 120, data signal 130 exhibits ledges 132 attributable to impedance mismatching. Differences between signals 120 and 130 are attributable to the larger capacitance and inductance of the 3 inch traces being driven with signal 130.

Ledges 122, 132, effectively increase the time it takes for data signals 120, 130, respectively, to settle into a high state 140 or a low state 150. As buses operate at higher frequencies, transmission line effects like ledges 122, 132 become more significant. Moreover, the power consumed by operating systems at higher frequencies is typically offset by using lower system voltages. This makes the amplitudes of ledges 122, 132 larger relative to the nominal voltages of high and low states 140, 150, respectively.

The present invention is a system and method for processing data signals more reliably by providing different reference voltages for high and low going transitions. The reference voltage levels are selected to increase the difference between the signal voltage and a first reference voltage level 220 (FIG. 2) on a low going transition, and to increase the voltage difference between the signal voltage and a second reference voltage level 230 (FIG. 2) on high going transitions. By switching the reference voltage level between first and second reference voltage levels 220, 230 according to the most recent signal level transition, the voltage of a signal 210 (FIG. 2) undergoing a transition may be determined earlier and more reliably in the signal interval. In this way, the present invention provides increased signal to noise and timing margins for processing data signals.

Figure 2:
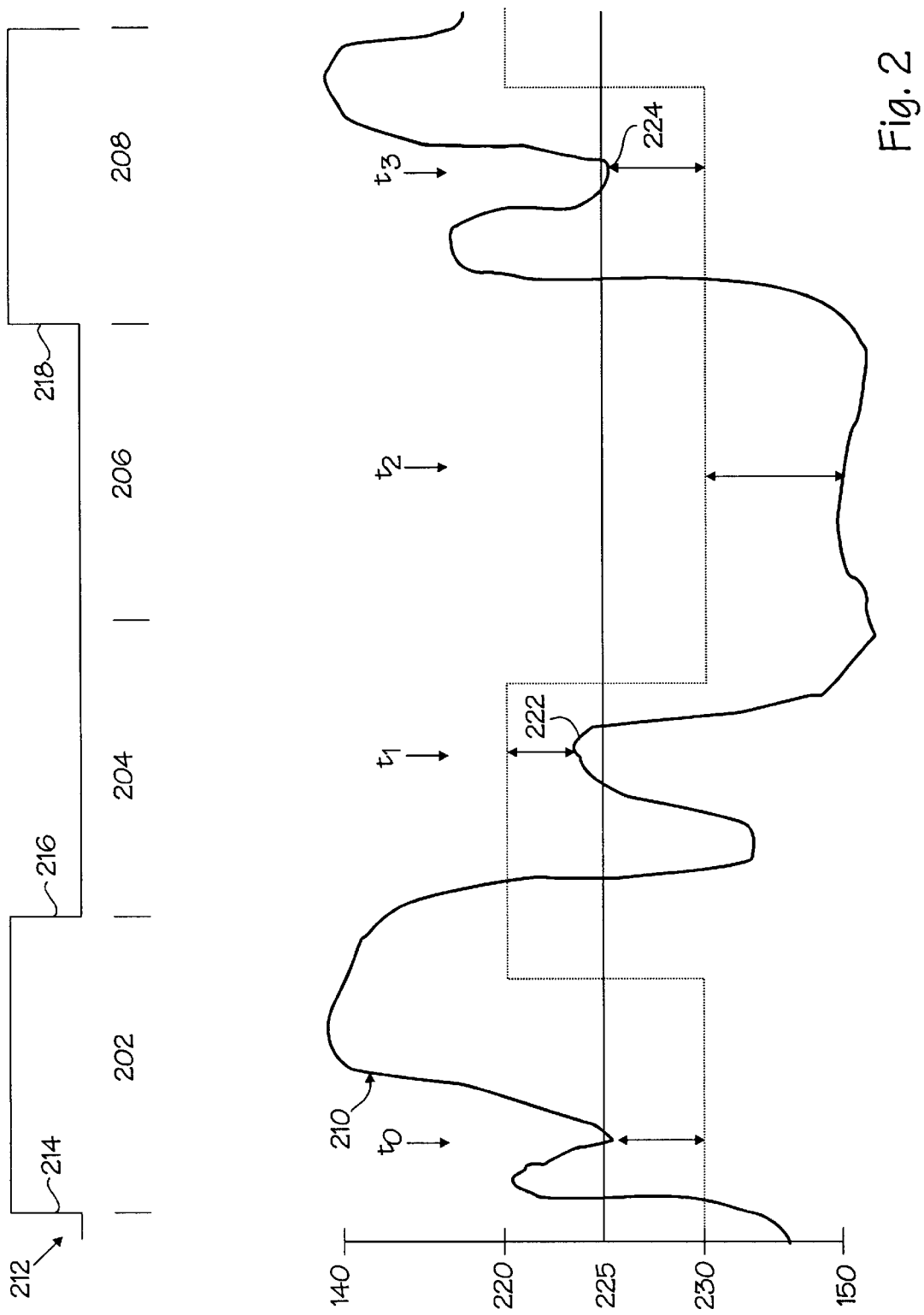
FIG. 2 is a schematic representation of a data signal being analyzed with respect to dual reference voltages in accordance with the present invention.

Referring now to FIG. 2, there is shown a schematic representation of a signal 210 undergoing transitions between high state 140 and low state 150, where the voltage level of signal 210 is determined with reference to first and second reference voltages 220, 230, respectively. For reference purposes, an idealized representation 212 of signal 210 is shown at the top of the figure along with signal transitions 214, 216, 218 and sampling intervals 202, 204, 206, 208 for signal 210. A single reference voltage level 225 is shown in the lower part of FIG. 2, at the approximate mid-point between high and low states 140, 150, respectively. Depending on the bus system, sampling intervals may occur once or twice per clock cycle. "Signal interval", "data interval", and "clock cycle" refer to the time interval over which data signal 210 represents a particular data bit.

Following transitions 214, 216, 218 of signal 210, one of voltage levels 220, 230 is selected to provide the reference voltage against which the voltage level of signal 210 will be measured in the next sampling interval, e.g. 202, 204, 208. Reference voltage selection is made according to whether the most recent level change of signal 210 was a high going transition 214, 218 or a low going transition 216.

Referring first to clock cycle 202, signal 210 is nominally at high level 140 following high going transition 214, and first reference voltage level 220 becomes operative in the latter part of interval 202. As interval 204 begins, signal 210 transitions to low level 150 (low-going transition 216). Following a delay, a voltage level is determined for signal 210 in interval 204 relative to first reference voltage level 220. Because first reference voltage level 220 is biased towards high level 140, the voltage difference between signal 210 and first reference voltage level 220 is relatively large, even at $t_1$ where reflection ledge 222 occurs. This margin makes comparison between signal 210 and first reference voltage level 220 more reliable, despite ledge 222 generated by low going transition 216. Low-going transition 216 is detected when signal 210 is sampled low ($Vs(t_1) < V(ref1)$). This triggers the reference voltage to switch, after a delay, from first reference voltage level 220 to second reference voltage level 230, which is biased toward low level 150.

Signal 210 remains low through interval 206, as measured with respect to second reference voltage level 230, i.e. ($Vs(t_2) < V(ref2)$). Because second reference voltage level 230 is biased toward low level 150, the difference between signal 210 and second reference voltage level 230 is less than it would be if mid-point voltage reference 225 was used. However, since signal 210 transitioned to low level 150 at the start of interval 204, it has had a full clock cycle to settle. Consequently, the noise associated with transitions is not present and it is relatively easy to measure the smaller difference between signal 210 and second voltage reference level 230 in clock cycle 206.

Signal 210 makes a high-going transition 218 towards high level 140 at the beginning of interval 208. In this case, the voltage level of signal 210 is determined relative to second reference voltage level 230. Since second reference voltage level 230 is biased toward low level 150, a substantial difference exists between second reference voltage level 230 and signal 210, even at $t_3$, where noise 224 associated with high going transition 218 is still present. High going transition 218 is indicated by the difference, $Vs(t_3) > V(ref2)$, triggering adjustment of reference voltage to first reference voltage level 220, following a delay.

Thus, use of a dual reference voltage system improves the signal margins used to determine the voltage state of signal 210. This increases the time interval during which the signal's voltage level can be sampled accurately. The cost of biasing reference voltage levels 220 and 230 towards high and low states 140 and 150, respectively, is a reduced voltage difference between signal 210 and reference levels 220, 230 in those intervals, e.g. 206, where signal 210 does not undergo a transition. As noted above, signal 210 has sufficient time to settle in these intervals, and the reduction in signal margin does not cause problems.

Figure 3:
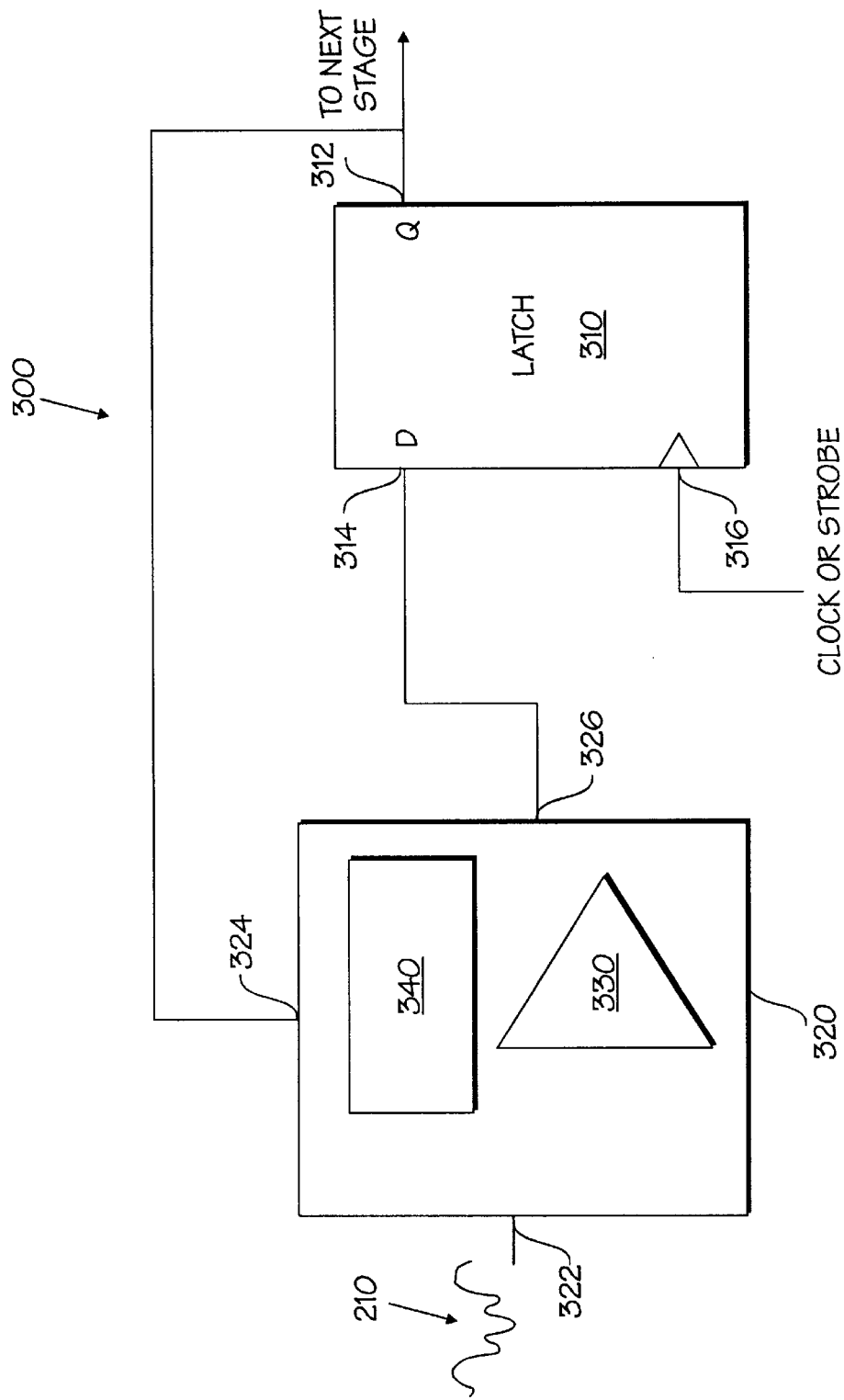
FIG. 3 is a block diagram of a dual reference voltage receiver in accordance with the present invention.

Referring now to FIG. 3, there is shown a block diagram of a dual reference voltage receiver 300 for a stage (not shown), in accordance with the present invention. Receiver 300 comprises a latch 310 and state machine 320, which includes logic for indicating an operative reference voltage level and for determining the voltage level of a data signal relative to the operative reference voltage level. In the disclosed embodiment, this logic is represented by voltage selection logic 340 and a comparator 330. State machine 320 has a first input 322 for receiving a data signal, e.g. signal 210, a second input 324 coupled to a data output 312 of latch 310, and an output 326 coupled to a data input 314 of latch 310.

Second input 324 provides state machine 320 with the voltage level of the data signal in the preceding interval, when the voltage level determined for this interval is latched into the next stage. State machine 320 uses this voltage level to select a reference voltage level, e.g. 220, 230, for use in determining a voltage level for data signal 210 in the next interval. In FIG. 2, for example, the high level determined for data signal 210 in interval 202 is provided to state machine 320, which selects reference voltage 220 for determining the voltage level of signal 210 in interval 204.

State machine 320 includes reference voltage selection logic 340 and comparator 330. Comparator 330 determines the difference between data signal 210 and one or more reference voltage levels, while selection logic 340 determines which of the reference voltage levels is operative for the interval. The coupling between comparator 330 and selection logic 340 may be implemented differently, depending on which embodiment of state machine 320 is employed.

Figure 4:
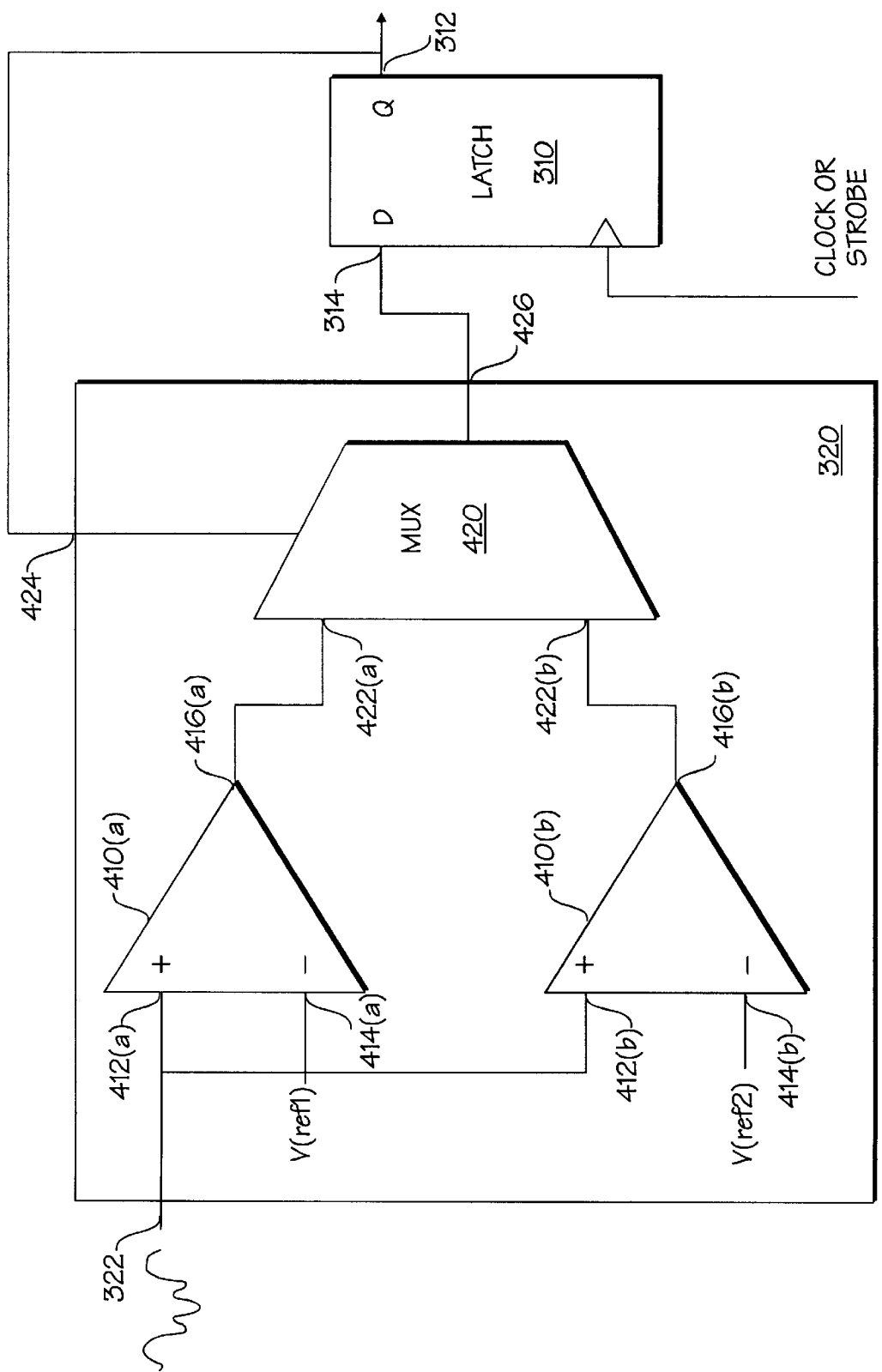
FIG. 4 is a block diagram of one embodiment of the dual reference voltage receiver of FIG. 3.

Referring now to FIG. 4, there is shown one embodiment of state machine 320 in receiver 300. In this embodiment, comparator 330 comprises first and second comparators 410(a) and 410(b), respectively, and selection logic 330 comprises a multiplexer (MUX) 420. Comparators 410(a), 410(b) have non-inverting inputs 412(a), 412(b), inverting inputs 414(a), 414(b), and outputs 416(a), 416(b), respectively. Data signal 210 is applied to non-inverting inputs 412(a), 412(b) of comparators 410(a), 410(b), respectively, and reference voltage levels 220, 230 are applied to inverting inputs 414(a), 414(b), respectively. Reference voltage levels 220, 230 may be derived from the system voltage through, for example, voltage dividers.

Comparator outputs 416(a) and 416(b) are coupled to first and second data inputs 422(a), 422(b), respectively, of MUX 420. A selection input 424 of MUX 420, corresponding to second input 324 of state machine 320, is coupled to data output 312 of latch 310. Output 426 of MUX 420 is coupled to data input 314 of latch 310. With this configuration, MUX 420 couples the output of comparator 410(a) or 410(b) to latch 310, according to the voltage level determined for data signal 210 in the previous clock cycle. Thus, signal 210 in the current clock cycle is compared with both reference voltage levels 220, 230, and MUX 420 selects between comparator outputs 416(a) and 416(b), according to the voltage level of data signal 210 in the previous clock cycle. When a high or low going transition alters the state of signal 210 at latch output 312, MUX 420 switches which comparator output 416(a), 416(b) is coupled through to latch 310.

Referring now to FIG. 5A, there is shown another embodiment of state machine 320 in receiver 300. In this embodiment of state machine 320, selection logic 340 and comparator 330 correspond to control state machine 530 and comparator 540. Control state machine 530 monitors data output 312 of latch 310 to determine the voltage level of signal 210 in the previous clock cycle, and adjusts the signals on outputs 532, 534, accordingly. Outputs 532, 534 are coupled to comparator 540 to adjust the threshold voltage against which signal 210 is compared.

Figure 5B:
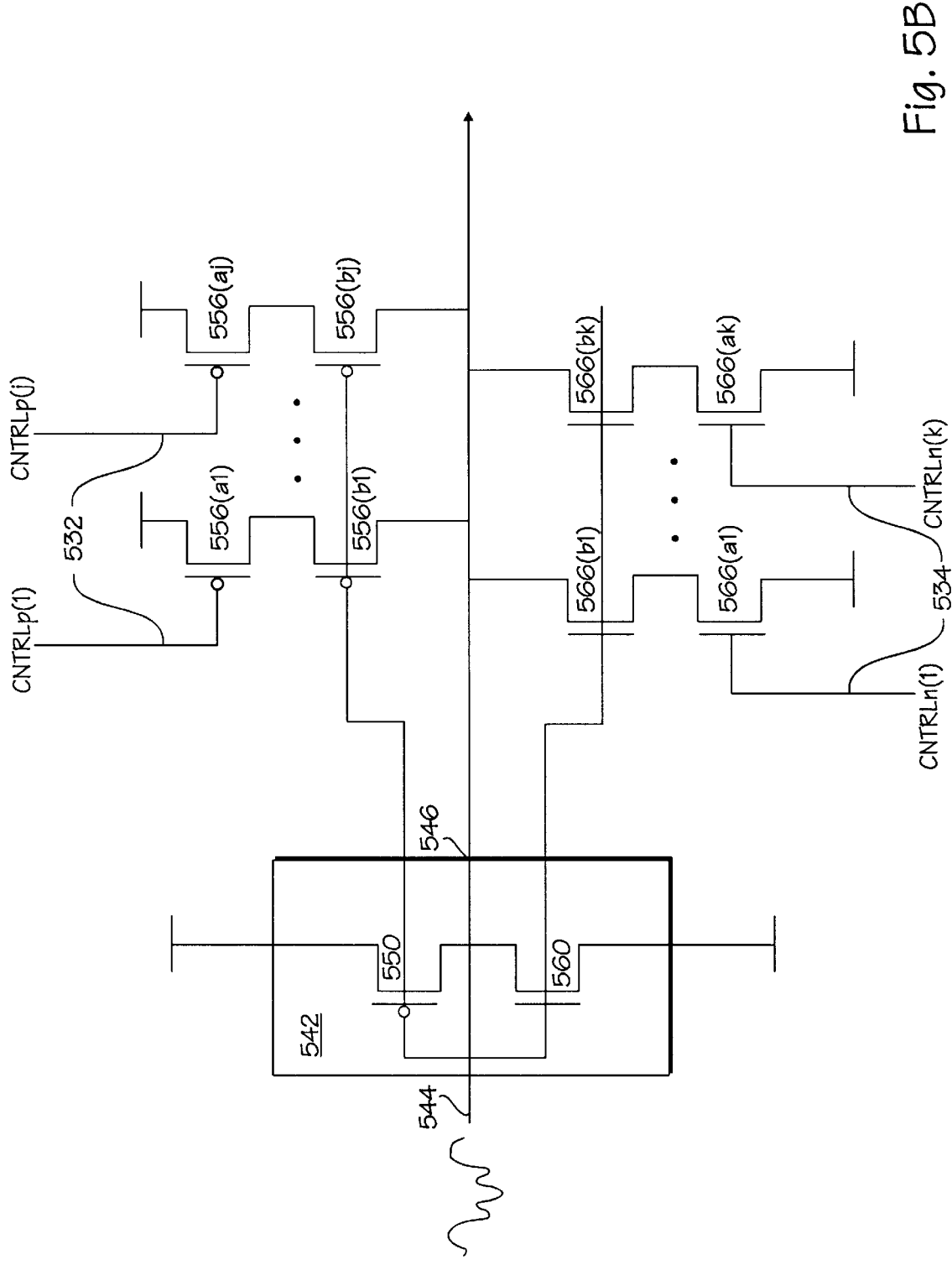
FIG. 5B is a schematic diagram of the voltage selecting circuit of the dual reference voltage receiver of FIG. 5A.

Referring now to FIG. 5B, there is shown a schematic representation of comparator 540 in accordance with the present invention. In this embodiment, comparator 540 comprises a p-type transistor 550 connected in series with an n-type transistor 560 to form an inverter 542, having an input 544 formed by the gates of transistors 550, 560 and an output 546 formed by drains of transistors 550, 560. Different threshold voltage levels are provided by adjusting the switch point of inverter 542 through outputs 532, 534 of control state machine 530. For this purpose, one or more p-type transistor pairs 556(a1), 556(b1) . . . 556(aj), 556(bj) are connected in parallel with transistor 550, and one or more additional n-type transistor pairs 566(a1), 566(b1) . . . 566(ak), 566(bk) are coupled in parallel with n-type transistor 560. Gates of transistors 556(a1)–556(aj) and 566(a1)–566(ak) are driven in parallel with gates 552 and 562 of inverter transistors 550, 560, respectively.

The transconductance of inverter 542 and, thus, its switching point, may be adjusted by driving the gates of selected transistors 556(b1)–556(bj) or selected transistors 566(b1)–566(b2). This allows the switching point of inverter 542 to function as a selectable reference voltage level for comparison with signal 210, according to signals provided by control state machine 530. By employing more than one set of transistor pairs 556, 566, this embodiment of state machine 330 not only switches between voltage reference levels 220, 230, but can also adjust voltage reference levels 220 and 230 independently, by activating different numbers of n or p transistor pairs 556, 566.

In the disclosed embodiments of dual reference receiver 300, latch 310 is driven by a clock signal or, in the case of a source synchronous interface, by a strobe. In the latter case, the strobe is transmitted with the data signal, and should be processed through an identical dual reference receiver 300 to provide it with the same signal to noise margin and delays as the data signal.

There has thus been provided a system and method for determining voltage levels for data signals transmitted at high frequencies, using dual reference voltage levels. The dual reference voltage levels are biased towards the high and low logic levels to provide improved voltage and signal-to-noise margins for high and low going data signal transitions.

While the invention has been described in terms of several embodiments, persons skilled in the art will recognize from the foregoing discussion that the invention is not limited to these embodiments, but may be practiced with modifications and alterations that fall within the scope of the appended claims.

What is claimed is:

1. A method for assigning a voltage state to a data signal in a sequence of sampling intervals, using first and second reference voltage levels biased towards high and low voltage states, respectively, the method comprising:

assigning a voltage state to the data signal in a first sampling interval of the sequence;

comparing the data signal in a next sampling interval of the sequence to the first reference voltage level when the data signal in the first sampling interval is assigned to the high voltage state; and comparing the data signal in the next sampling interval of the sequence to the second reference voltage level when the data signal in the first sampling interval is assigned to the low voltage state.

2. The method of claim 1, further including:

assigning a high voltage state to the data signal in the next sampling interval when the data signal has a voltage that is higher than the first reference voltage level, and the data signal in the first sampling interval is assigned to the high voltage state; and assigning a low voltage state to the data signal in the next sampling interval when the data signal has a voltage that is less than the first reference voltage level, and the data signal in the first sampling interval is assigned to the high voltage state.

3. The method of claim 1, further including:

assigning a low voltage state to the data signal in the next sampling interval when the data signal has a voltage that is less than the second reference voltage level and the data signal in the first sampling interval is assigned to the low voltage state; and assigning a high voltage state to the data signal when the data signal has a voltage in the next sampling interval that is greater than the second reference voltage level and the data signal in the interval is assigned to the low voltage state.

4. A method for analyzing a data signal comprising:

comparing a voltage of the data signal in a first sampling interval with an operative reference voltage that is selected from a first voltage level, biased toward a high voltage state, and a second voltage level, biased toward a low voltage state;

adjusting the operative reference voltage for a next sampling interval to the first voltage level when the comparison indicates that the data signal in the first sampling interval is in the high voltage state and the operative voltage is at the second voltage level; and adjusting the operative reference voltage for the next sampling interval to the second voltage level when the comparison indicates that the data signal in the first sampling interval is in the low voltage state and the operative reference voltage is at the first voltage level.

5. The method of claim 4, further comprising:

assigning the data signal in the next sampling interval to the high voltage state when the data signal voltage is greater than the operative voltage; and assigning the data signal in the next sampling interval to the low voltage state when the data signal voltage is less than the operative voltage.

6. A dual reference voltage receiver comprising:

comparison logic to provide an indication of a voltage state for a received data signal relative to an operative reference voltage in a first sampling interval;

a latch having an input to receive the voltage state indication and an output to reproduce the received voltage state indication in response to a timing signal; and voltage selection logic coupled to the comparison logic and the latch, to select an operative reference voltage for a next sampling interval from first and second reference voltages, according to the voltage state indication at the latch output.

7. The dual reference voltage receiver of claim 6, wherein the comparison logic comprises first and second comparators for comparing the data signal in the first sampling interval to the first and second reference voltages to provide indications of the voltage state of the data signal relative to the first and second reference voltages, one of which reference voltages is selected as the operative reference voltage in the next sampling interval by the selection logic.

8. The dual reference voltage receiver of claim 7, wherein the selection logic comprises a MUX having a pair of inputs for receiving the voltage state indications from the comparators, an output for coupling one of the voltage state indications to the latch input, and a selection input coupled to the latch output for selecting the voltage state indication that is coupled to the latch input according to the voltage state indications at the latch output.

9. The dual reference voltage receiver of claim 6, wherein the comparison logic comprises an inverter having an input for receiving the data signal, a switching point voltage for comparison with the data signal, and an output for providing a voltage state indication according to the comparison, the switching point voltage of the inverter being adjusted to the first and second reference voltages through a signal from the selection logic, according to whether the first or second reference voltage is the operative reference voltage.

10. The dual reference voltage receiver of claim 9, wherein the inverter comprises a plurality of transistors coupled between the inverter output and a supply voltage, at least one of the plurality of transistors being driven by the selection logic to adjust the switching point voltage of the inverter.

11. The dual reference voltage receiver of claim 10, wherein the selection logic comprises a state machine having a voltage state input coupled to the latch output, a control line coupled to the plurality of transistors of the inverter, and logic for generating a driving signal on the control line according to the voltage state signal applied to the voltage state input.

12. A receiver circuit comprising:

a state machine including voltage selection logic for selecting a reference voltage level for a next sampling interval of a data signal according to a signal level received at an input of the state machine from a current sampling interval and also including comparison logic coupled to the selection logic, for comparing an input signal to the selected reference voltage level and generating a signal level according to the comparison; and a latch coupled to the state machine for storing the generated signal level and coupling an indication of the generated signal level to the input of the state machine.

13. The receiver of claim 12, wherein the voltage selection logic is a MUX having its select gate coupled to the output of the latch.

14. The receiver of claim 13, wherein the comparison logic includes first and second comparators, each having inverting and non-inverting inputs and an output, the first and second comparators having first and second reference voltages, respectively, coupled to their inverting inputs and each having the input signal coupled to its non-inverting input, and where the outputs of the comparators are coupled to the latch through first and second inputs of the MUX.

15. The receiver of claim 12, wherein the comparison logic comprises an inverter having an input and an output and including a plurality of transistors coupled between a supply voltage and the inverter output, at least one of the plurality of transistors being driven by the voltage selection logic to adjust a switching point of the inverter according to the signal level received at the state machine input.

16. A method for determining a data signal voltage level for a signal received at a receiver circuit, the method comprising the steps of:

detecting a voltage level of the signal in a current sampling interval;

selecting a reference voltage level for a next sampling interval from first and second reference voltage levels according to the voltage level in the current sampling interval;

comparing the received signal with the selected reference voltage level;

generating a signal voltage level for the received signal according to whether the received signal level is greater or less than the reference voltage level.

17. A method for assigning a data signal in a sampling interval to a high or low state, the method comprising the steps of:

selecting an operative reference voltage for a next sampling interval at a first voltage level biased towards the high voltage state, when the data signal in a current sampling interval is in the high voltage state; and selecting the operative reference voltage for the next sampling interval at a second voltage level biased toward the low voltage state, when the data signal in the current interval is in the low voltage state;

comparing the data signal with the operative reference voltage; and assigning the data signal to the high or low voltage state according to whether a voltage of the data signal is greater or less than the operative voltage.

18. The method of claim 17, further comprising switching the operative reference voltage for an $N^{th}$ sampling interval between the first and second voltage levels when the voltage state assigned to the data signal in the $N-1^{st}$ sampling level changes.

19. A method for assigning high and low voltage states to a data signal using first and second reference voltages biased towards the high and low voltage states, respectively, the method comprising:

selecting an operative reference voltage from the first and second reference levels;

comparing the data signal in a first sampling interval with the operative reference voltage;

adjusting the operative reference voltage to the first level when the data signal is in the high state and the selected operative reference voltage is at the second reference level;

adjusting the operative reference voltage to the second level when the data signal is in the low state and the selected operative reference voltage is at the first reference level; and comparing the data signal in a next sampling interval with the adjusted operative reference voltage.

20. The method of claim 1, wherein the sequence of sampling intervals are indicated by clock or strobe signals.

21. The method of claim 1, wherein the first and second reference voltage levels are determined by a switching point of an inverter.

22. The method of claim 20, wherein comparing the data signal with a first reference voltage comprises:

increasing the switch point of the inverter; and applying the data signal in the next sampling interval to an input of the inverter.

23. The method of claim 20, wherein comparing the data signal with the second reference voltage comprises:

decreasing the switch point of the inverter; and applying the data signal in the next sampling interval to an input of the inverter.

24. The method of claim 4, wherein the operative reference voltage is determined by a switching point of an inverter.

25. The method of claim 23, wherein adjusting the operative reference voltage to the first and second reference voltage levels comprises increasing and decreasing, respectively, the switching point of the inverter.

26. The method of claim 19, wherein comparing the data signal in the first sampling interval comprises applying the data signal to an inverter, a switching point of the inverter determining the operative reference voltage.

27. The method of claim 25, wherein adjusting the operative reference voltage to the first and second voltage level comprises increasing and decreasing, respectively, the switching point of the inverter.

* * * * *